A. GIRAUDAT.
MOTIVE POWER.

No. 33,139. Patented Aug. 27. 1861.

Witnesses,
J W Coombs
R. S. Spencer

Inventor;
A. Giraudat

UNITED STATES PATENT OFFICE.

A. GIRAUDAT, OF NEW YORK, N. Y.

MOTIVE POWER.

Specification of Letters Patent No. 33,139, dated August 27, 1861.

*To all whom it may concern:*

Be it known that I, A. GIRAUDAT, of the city, county, and State of New York, have invented a new and Improved Motive Power; and I do hereby declare that the following is a full, clear, and exact description of the same, reference being had to the accompanying drawing, forming a part of this specification, in which—

Figure 1:
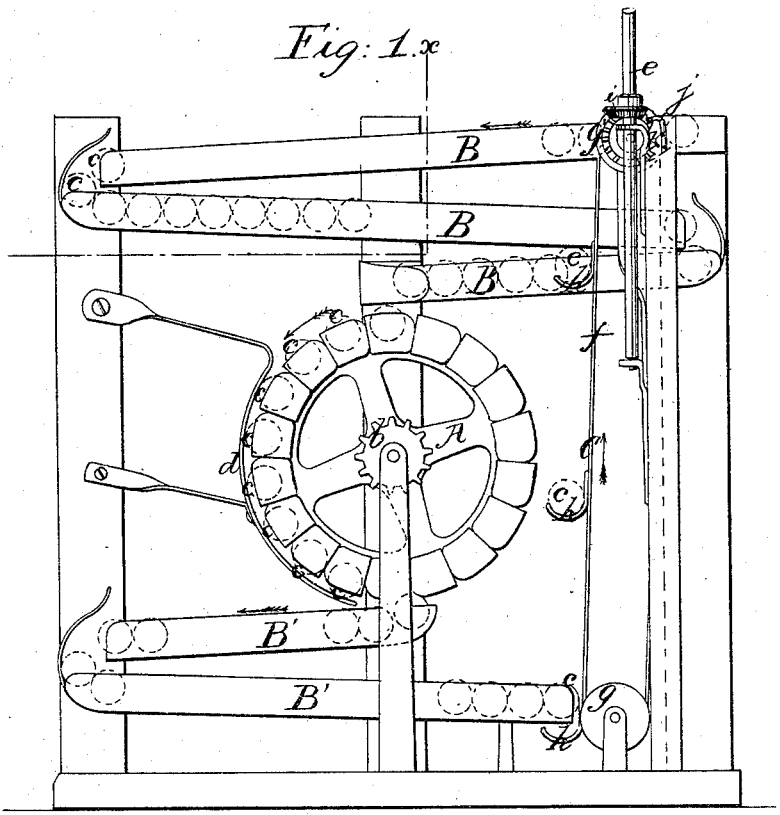
Figure 2:
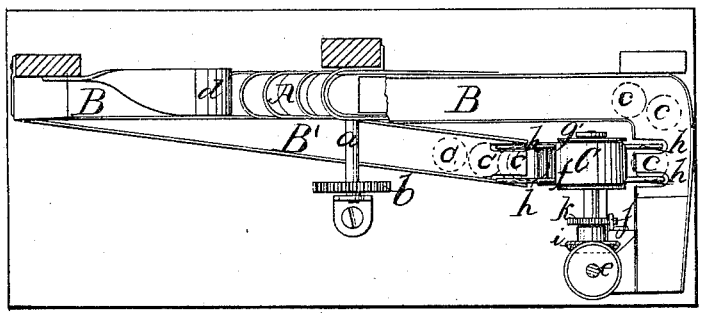

Figure 1 represents a front elevation of my invention. Fig. 2 is a horizontal section of ditto, taken in the plane indicated by the line $x. x.$ Fig. 1.

Similar letters of reference in both views indicate corresponding parts.

The only power which is at the command of man at least during a large part of the time, and which involves no expense except the cost of machinery and of keeping the same in repair, is the power of the wind, and if this power was steady and continuous, a cheaper motive power could not be devised. The difficulty with wind wheels is that in some cases, when a strong wind prevails, an unnecessary amount of power is expended and in other times, when the wind lulls or goes down, only a slow motion or no motive at all is produced.

To amend this difficulty and to store up the surplus power of a wind wheel when a high wind prevails so as to be able to produce a uniform and continuous rotary motion, is the object of my invention, which consists in the combination with a wind wheel of a bucket wheel to be operated by a series of balls of stone or other heavy material which are conducted to the wheel through long inclined channels and which after having descended, are elevated by the action of the wind wheel whenever the wind has sufficient power to produce a motion of the same, and of the elevator, which serves to raise the balls.

To enable those skilled in the art to make and use my invention, I will proceed to describe its construction and operation with reference to the drawing.

The bucket wheel A. to which a continuous and uniform rotary motion is to be imparted, is secured to a shaft $a.$ from which the motion is transmitted to the working machines or to the desired place, by means of a cog wheel $b.$ or in any other desirable manner. The bucket wheel derives its motion from the gravity of a series of balls $c.$ of stone or other heavy material, which are conducted to the buckets through inclined channels B. similar to an overshot water wheel, and as the wheel turns, it discharges one ball after the other into channels B′. a guard $d.$ being provided to prevent the premature discharge of any of the balls. The channels B. B′. must be made sufficiently long to enable them to hold a large number of the balls, so that the wheel A. continues to rotate for a pretty long time, always being supplied with fresh balls from the upper channels and discharging said balls into the lower channels.

The balls are raised from the lower to the upper channels by an elevator C, which derives its motion from a wind wheel connected to the vertical arbor $e.$ The elevator consists of an endless belt $f.$ which passes over two pulleys $g. g'.$ and which is provided with hooked fingers $h.$ A rotary motion is imparted to the upper pulley $g'.$ by a bevel gear $i.$ from the arbor $e.$ of the wind wheel and the fingers $h.$ on moving with the belt in the direction of the arrow marked near it in Fig. 1, catch into the slotted end of the lower channel B′. and each pair of fingers takes up one of the balls, that may be deposited in said channel and on passing over the top of the upper pulley $g'.$ the ball are discharged into the upper channel B. through which they are conducted down to bucket wheel A. A retrograde motion of the elevator is prevented by a spring pawl $j.$ catching into the teeth of a ratchet-wheel $k.$ on the axle of the upper pulley $g.$ The elevator will continue to raise the ball from the lower to the upper channel as long as the wind has sufficient power to give motion to the wind wheel, and it is obvious that the wind wheel may be so proportioned, that the same is able with little wind to raise the balls sufficiently quick to keep up a supply for the bucket wheel and that when a high wind prevails, the balls are raised much quicker that necessary to supply the bucket wheel, thus storing up the surplus power of the high wind for such times, where the wind goes down altogether or where it has not sufficient power to raise any of the balls.

With a wind wheel of sufficient power, and with a sufficient number of balls the bucket wheel can be kept in a continuous and uniform motion.

Having thus fully described my invention, what I claim as new and desire to secure by Letters Patent is;

The arrangement in combination with an ordinary wind wheel, of a bucket wheel A. inclined channels B. and elevator C. constructed and operating in the manner and for the purpose specified.

A. GIRAUDAT.

Witnesses:
 W. HAUFF,
 J. F. BUCKLEY.